O. H. HUEBEL & F. W. MANGER.

SOAP AND SPONGE HOLDER.

No. 11,610. Reissued June 15, 1897.

Witnesses
E. J. Nottingham
G. F. Downing

Inventors
O. H. Huebel
F. W. Manger
By H. A. Seymour
Attorney

THE NORRIS PETERS CO., PHOTO-LITHO., WASHINGTON, D. C.

UNITED STATES PATENT OFFICE.

OTTO HENRY HUEBEL AND FREDERICK WILLIAM MANGER, OF BROOKLYN, NEW YORK, ASSIGNORS, BY MESNE ASSIGNMENTS, TO LEO FRANK, OF NEW YORK, N. Y.

SOAP AND SPONGE HOLDER.

SPECIFICATION forming part of Reissued Letters Patent No. 11,610, dated June 15, 1897.

Original No. 553,241, dated January 21, 1896. Application for reissue filed February 5, 1897. Serial No. 622,232.

*To all whom it may concern:*

Be it known that we, OTTO HENRY HUEBEL and FREDERICK WILLIAM MANGER, of the city of Brooklyn, Kings county, and State of New York, have invented a certain new and useful Improvement in Soap and Sponge Holders, of which the following is a specification.

The object of our improvement is to provide a simple and efficient device capable of attachment to the side of a bath-tub and serving to hold a piece of soap and a sponge or analogous articles.

We will describe an article embodying our improvement and then point out the novel features in the claims.

Figure 1:
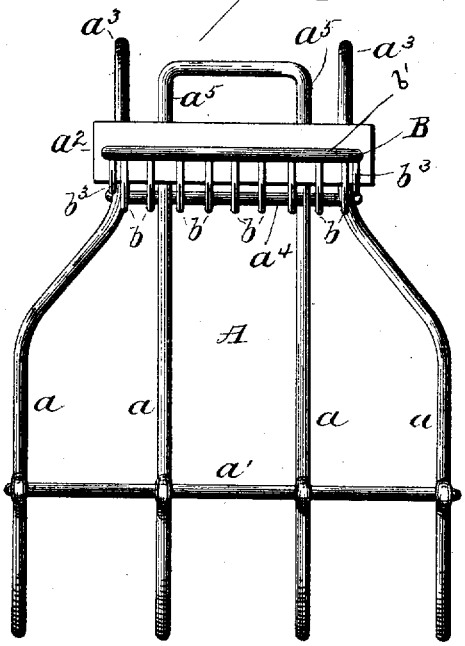
Figure 2:
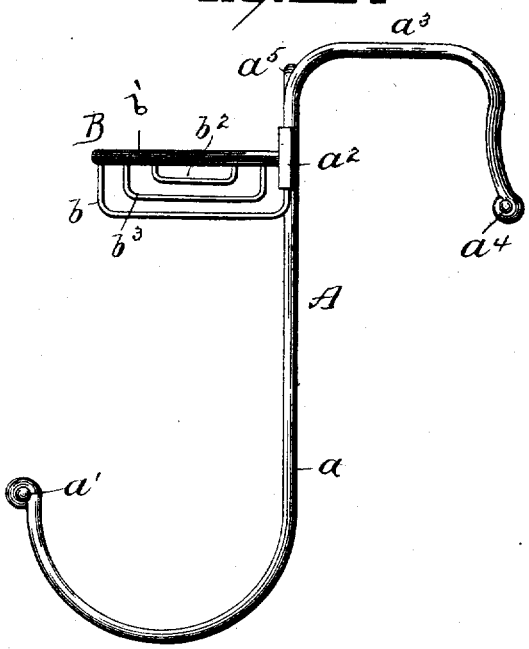
Figure 3:
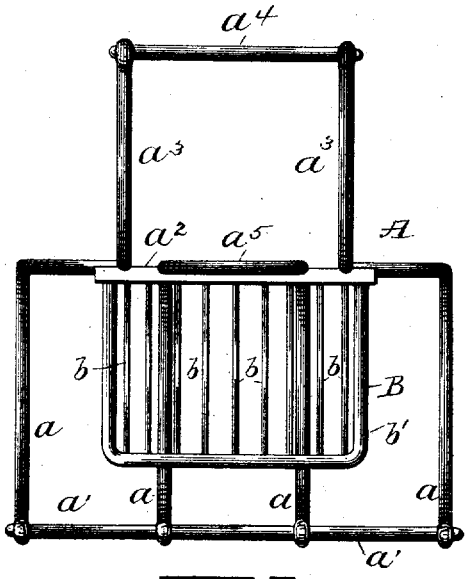

In the accompanying drawings, Figure 1 is a front view of an article embodying our improvement. Fig. 2 is a side view thereof. Fig. 3 is a plan or top view of the same.

Similar letters of reference designate corresponding parts in all the figures.

A designates a sponge-holder. It is of open or skeleton construction. As here shown, it is composed of a number of wires $a$, bent downwardly and at the lower extremities bent forwardly and upwardly. The upturned extremities are connected to a cross bar or wire $a'$. The other extremities of the wires $a$ are fastened to a bar or plate $a^2$. They may pass through the bar or plate or between it and another.

B designates the soap-holder. It is also of open or skeleton construction. As is here shown, it is constructed of a number of wires $b$, extended from the lower edge of the plate $a^2$ and bent downwardly and then forwardly and then upwardly. These wires $b$ at their outer ends are connected by solder or otherwise to a wire $b'$, which is extended horizontally outward from the bar or plate $a^2$. As here shown, wires $b^2$ and $b^3$ are extended outwardly from the side portions of the bar $b'$ to form the sides of the soap-holder.

From the bar or plate $a^2$ extend means whereby the entire article may be fastened to or hung upon the side of the bath-tub. As here shown, these means consist of wires bent over into hook form to embrace the upper edge of a bath-tub. As here shown, these wires consist of extensions $a^3$ of the wires $a$, the extremities of said extensions being connected by a wire $a^4$. The middle wires $a$ are extended upward, as shown at $a^5$, to bear against the wall of the bath-tub.

It will be seen that by our improvement we have produced a very simple and convenient article for holding a piece of soap and a sponge or analogous articles.

What we claim as new, and desire to secure by Letters Patent, is—

1. A combined sponge and soap holder comprising curved wires forming the sponge-holder, a bar connecting said wires, a soap-holder attached to said bar, and suspending devices projecting above said bar, substantially as set forth.

2. A combined sponge and soap holder comprising a series of wires curved upwardly and outwardly at their lower ends to form the sponge-holder, some of said wires being bent at their upper ends to form a bail, a cross-bar secured to said wires at the lower end of the bail and a soap-holder attached to said bar, substantially as set forth.

3. A rack comprising side wires and intermediate wires, all of said wires being turned outward and upward and connected at their lower ends, the said side wires being hook-shaped at their upper ends and a connection between all of said wires adjacent the upper portions of the intermediate wires and below the hooked upper ends of the side wires, substantially as specified.

4. A rack comprising side wires and intermediate wires, all of said wires being turned outward and upward and connected at their lower ends, the said side wires having hook portions at their upper ends, above the plane of the lower upturned ends, and a connection between all of said wires adjacent the upper portions of the intermediate wires and below the hook portions of the side wires, substantially as specified.

5. A rack composed of the side wires bent outward and upward at one end, and connected thereat by a cross-wire and then bent at the upper end into substantially parallel hooks, a cross-wire connecting the vertical portions of said side wires on a plane above the first-named cross-wire, intermediate wires substantially parallel with the side wires and having portions turned outward and upward to connect with the lower cross-wire and having their upper ends connected to the upper cross-wire, substantially as specified.

6. The combination with the side wires bent as described and the wires rigidly connecting the ends thereof, an intermediate wire having its lower portion bent to conform to the lower portions of the side wires of the cross piece or plate connecting the vertical portions of said wires above the lower connecting-wire and below the hook portions of the side wires, substantially as specified.

7. The combination with the side wires, bent substantially as described and the cross-wires rigidly connecting the upper and lower ends thereof, the intermediate wire comprising two members having an integral connection at the top, the members of the intermediate wire being bent to conform to the lower portions of the side wires, of the cross-piece connecting the upper portions of all of said wires above the lower cross-wire and the soap-rack connected to said cross-piece, substantially as specified.

In testimony whereof we have signed our names to this specification in the presence of two subscribing witnesses.

OTTO HENRY HUEBEL.
FREDERICK WILLIAM MANGER.

Witnesses:
HARRY J. WILLIAMSON,
I. H. PITT.